United States Patent
Jung

(10) Patent No.: US 9,021,248 B2
(45) Date of Patent: Apr. 28, 2015

(54) SECURE ACCESS OF MOBILE DEVICES USING PASSWORDS

(71) Applicant: SolidMobile, Inc., San Jose, CA (US)

(72) Inventor: Nae Kwon Jung, Seoul (KR)

(73) Assignee: SolidMobile, Inc., San Jose, CA (US)

( * ) Notice: Subject to any disclaimer, the term of this patent is extended or adjusted under 35 U.S.C. 154(b) by 13 days.

(21) Appl. No.: 13/973,817

(22) Filed: Aug. 22, 2013

(65) Prior Publication Data

US 2015/0058618 A1    Feb. 26, 2015

(51) Int. Cl.
*H04L 29/06*      (2006.01)
*H04L 9/32*      (2006.01)
*G06F 21/00*      (2013.01)
*G06F 21/60*      (2013.01)

(52) U.S. Cl.
CPC .............. *H04L 63/083* (2013.01); *G06F 21/60* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 5,491,752 A | * | 2/1996 | Kaufman et al. | 380/30 |
| 6,064,736 A | * | 5/2000 | Davis et al. | 713/155 |
| 2006/0156026 A1 | * | 7/2006 | Utin | 713/183 |
| 2007/0186103 A1 | * | 8/2007 | Randle et al. | 713/168 |

* cited by examiner

*Primary Examiner* — Fatoumata Traore
(74) *Attorney, Agent, or Firm* — Fenwick & West LLP

(57) ABSTRACT

Enhanced security measures are provided for accessing applications or data on a client device using an encryption scheme. The client device receives authorization to access the applications or data from a server that compares a password received at the client device with a password previously stored in the server. In addition to comparing the passwords, the server may implement additional security measures such as checking geographic locations of the client device or monitoring for suspicious patterns of usage on the client device. Further, different passwords may be used depending on whether the client device has connectivity with the server. When the connectivity is not available, a longer or more complicated password may be used instead of a shorter or simple password to provide added security. When the user is authenticated, a key is made available to access applications or data on the client device.

17 Claims, 6 Drawing Sheets

SECURE ACCESS OF MOBILE DEVICES USING PASSWORDS

BACKGROUND

1. Field of Disclosure

The present disclosure relates to enabling secure access to applications executed on computing devices or encrypted data in computing devices, and more specifically to using passwords to authorize access to encrypted data or applications in a mobile computing device.

2. Description of the Related Art

A password is a word or string of characters that is used for authenticating an identity of a user or for gaining access to a restricted resource. Passwords are often used by itself or in combination with other schemes (e.g., digital certificate) to authenticate the user. The security level of passwords can differ depending on the length of the passwords and the number of possible characters that can be used in the passwords. The longer the length of the permissible passwords and larger the number of usable characters in the passwords, the higher the level of security of the passwords. Short passwords with limited choice of usable characters are more vulnerable to cracking (for example, by brute force attacks) compared to longer passwords.

For convenience reasons, passwords are predominantly used to authenticate users or control access to resources on mobile devices. Mobile devices often have user interface devices such as touch screens that are less accurate and slower to operate. Hence, users tend to shun away from using complex passwords or other more complex authentication schemes when using mobile devices. On smartphones, for example, most users prefer the use of a four digit numeric password over longer and more complicated passwords.

Despite the small size and portability, mobile computing devices such as smartphones often store and access sensitive information. Such sensitive information may include, for example, personal information (e.g., social security number, bank account numbers and passwords), confidential emails or messages, and credit card numbers. Oftentimes, the security provided by simple passwords is insufficient, making the mobile computing devices vulnerable to attack by a third party.

SUMMARY

Embodiments relate to authenticating a user of a first computing device based at least on comparing of first information and second information at a second computing device. Responsive to authenticating the user at the second computing device, the first computing device receives an unencrypted server token from a second computing device. The unencrypted server token is used for accessing an application or encrypted data. The first information is derived from a user input received at a first time. The second information is derived from a first password provided by the user at a second time preceding the first time.

In one embodiment, the second computing device authenticates the user based further on at least one of a geographical location of the first computing device and statistical information associated with the usage of the first computer device.

In one embodiment, the unencrypted server token is used as a key for accessing the application or the encrypted data. Alternatively, the unencrypted server token may be processed to obtain the key.

In one embodiment, the unencrypted server token is used in conjunction with a device token of the first computing device to generate a key for accessing the application or the encrypted data.

In one embodiment, a second password is received at a third time from the user of first computing device when the communication between the first and the second computing devices is unavailable at the third time. An encrypted server token stored in the first computing device is decrypted using the second password to obtain the unencrypted server token.

In one embodiment, the second password is stronger than the first password. For example, the second password is longer than the first password. Alternatively or in addition, the first password may be a combination of first possible characters and the second password may be a combination of second possible characters where a number of the second possible characters is larger than a number of the first possible characters.

In one embodiment, the first information is obtained by processing the user input received at the first time by a hash function, and the second information is obtained by processing the first password received at the second time by the hash function.

In one embodiment, the unencrypted server token and data derived from the unencrypted server token are deleted from the first computing device responsive to terminating access to the application or the encrypted data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the subject matter.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the claimed subject matter.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only. Alternative embodiments of the structures and methods illustrated herein may be employed without departing from the principles described herein.

Embodiments relate to providing enhanced security measures for accessing applications or data on a client device. The client device receives authorization to access the applications or data from a server that compares a password received at the client device with a password previously stored in the server. In addition to comparing the passwords, the server may implement additional security measures (e.g., checking geographic locations of the client device or monitoring for suspicious patterns of usage on the client device) to enhance security for accessing applications or data on the client device. Further, different passwords of different strengths may be used depending on whether the client device has connectivity with the server. When the connectivity is not available, a longer and/or more complicated password may be used instead of a shorter and/or simpler password to provide added security.

Figure 1:
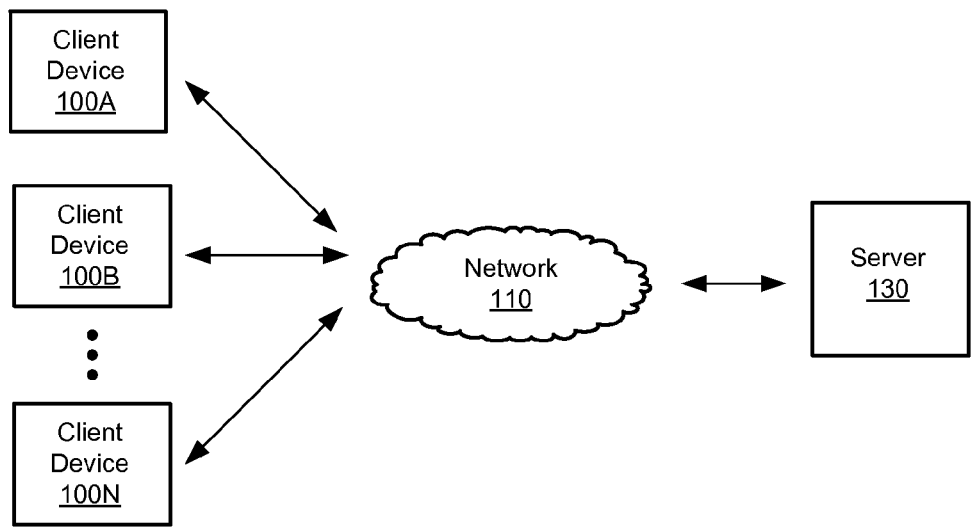
FIG. 1 is a schematic diagram illustrating architecture of a system where a server provides enhanced security to applications executed on client devices, according to one embodiment.

FIG. 1 is a schematic diagram illustrating architecture of a system where a server 130 provides enhanced security measures to applications executed on client devices 100A through 100N (hereinafter collectively referred to as "the client devices 100"), according to one embodiment. The client devices 100 store software codes for one or more applications that may be loaded and executed on the client devices 100. In one or more embodiments, the applications interact with or receive information from the server 130 via a network 110. The client devices 100 may interact with multiple servers, some of which may be dedicated for certain applications.

The network 110 may be various types of communication network including wireless and wired communication network such as PSTN (Public Switched Telephone Network) network, cable television network, cellular phone network, and satellite communication network. The network may be a part of the Internet or provide connection to the Internet.

The server 130 is a computing device capable of providing services and information to multiple client devices 100. In one or more embodiments, the server 130 communicates with the client devices 100 via TCP/IP (Transmission Control Protocol/Internet Protocol) and HTTP (or HTTPS) protocol. Services or functions provided by the server 130 include authenticating the users of the client devices 100. Although only a single server 130 is illustrated in FIG. 1, more than one server may be provided to service a large number of client devices 100.

Figure 2:
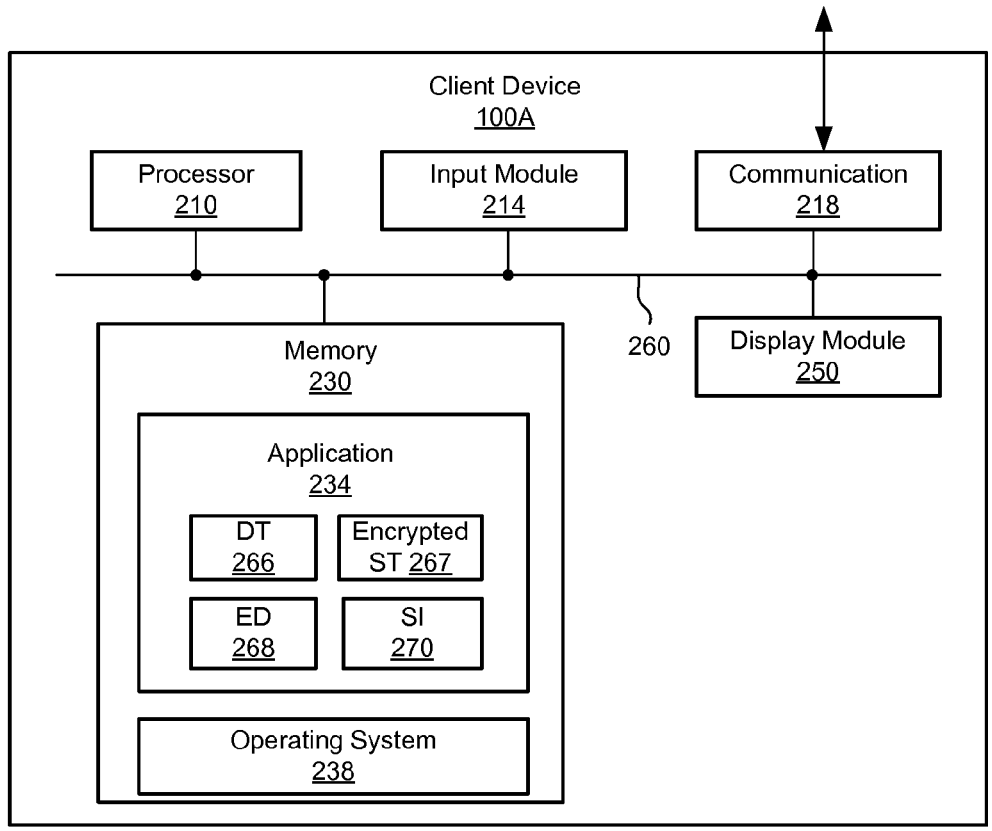
FIG. 2 is a block diagram illustrating a client device according to one embodiment of the present invention.

FIG. 2 is a block diagram illustrating the client device 100A according to one embodiment. The client device 100A may be one of various devices such as a smartphone, personal computer, a laptop computer, an e-book reader, an electronic picture frame, a desktop widget player, a Personal Digital Assistant (PDA), an MP3 player, a stand-alone multimedia player (e.g., Divx player), and a cellular phone. In one or more embodiments, the client device 100A is capable of executing one or more applications that enables access data stored therein.

The client device 100A may include, among other modules, a processor 210, a memory 230, an input module 214, a display module 250, and a communication module 218. Not all components of the client device 100A are shown in FIG. 2 and certain components not necessary for illustration of embodiments (for example, audio speakers) are omitted herein. Each component of the client device 100A may be communicatively coupled through a bus 260. Each component of the client device 100A, whether alone or in combination with other components, can be implemented for example, in software, hardware, firmware or any other combination thereof.

The processor 210 is a conventional processor or controller such as Intel® Pentium® processor, and ARM processor. The processor 210 reads and executes instructions and/or data stored in the memory 230. The instructions and/or data executed on the processor 210 include codes for performing any techniques described herein. In one embodiment, the memory 230 is a dynamic random access memory (DRAM) device, a static random access memory (SRAM) device, or some other conventional memory device.

The input module 214 is a user interface device such as a mouse, a trackball, a stylus, a pen, a touchscreen, a keyboard or other mechanisms for receiving user inputs associated with manipulation of the applications executed on the client device 100A. The user input received via the input module 214 includes, among others, passwords for authenticating users of the client device 100A.

The display module 250 may include display devices such as an organic light-emitting diode (OLED) and a liquid crystal display (LCD) for displaying a screen that can be viewed by the user. The screen of the display module 250 may display, for example, graphic user interface screens as described below in detail with reference to FIGS. 7A and 7B.

The communication module 218 may include one or more wired or wireless communication interfaces used to communicate with the server 130 over the network 110. For example, the communication interface 218 may include a long-term evolution (LTE) interface, 3G mobile communication interface, Enhanced Voice-Data Optimized (EVDO) interface or a Wi-Fi interface (e.g., IEEE 802.11b/g)) for communication with the server 130 via the network 110.

The memory 230 is a non-transitory computer readable storage medium that may store code modules including, among others, an application 234 and an operating system 238. The operating system 238 includes instruction codes for managing software and hardware resources available on the client device 100A. Example operating systems 238 include iOS, Android, Windows Phone, Linux, OS X, and WINDOWS.

The application 234 includes instruction codes for enabling selected users to access encrypted data (ED) 268. In one embodiment, the application 234 may store a device token (DT) 266 and an encrypted server token (ST) 267. The device token 266 and the encrypted server token 267 enable the user to access the encrypted data 268 by decrypting the encrypted data 268 when the connectivity to the server 130 is unavailable, as described below in detail with reference to FIGS. 4 and 6. In other embodiments, the application 234 does not store or use the device token (DT) 266. In such embodiments, the applications 234 uses only the encrypted server token (ST) 267 that can be decrypted for accessing the encrypted data (ED) 268. The application 234 also includes a server interface (SI) 270 for performing operations to enable the server 130 to authenticate the user when the connectivity to the server 130 is available, as described below in detail with reference to FIGS. 4 and 5.

The application 234 may be a software module providing services including, but not limited to: (i) email client service, (ii) instant messaging service, (iii) utility program storing personal information, (iv) financial transaction service, (v) social networking service, (vi) paid online service, and (vii) medical information service. The application 234 may also function as a gateway keeper that approves or disapproves access to or use of other applications.

The device token 266 is a piece of information stored in the client device 100A. A server token is a piece of information generated by the server 130 that is used in combination with the device token 266 to decrypt encrypted data 268 stored in the client device 100A. The use of the device token 266 is advantageous, among other reasons, because unauthorized access to the client device 100A may be prevented by simply deleting the device token 266 from the client device 100A. However, the use of the device token 266 is not essential and some embodiments may simplify the encryption scheme by removing the device token 266.

An unencrypted server token may be received from the server 130 via the network 110 when an authorized user attempts to use the application or access the encrypted data 268. The unencrypted server token is removed and not stored in the client device 100A to prevent unauthorized access to the encrypted data 268 by unauthorized users. The unencrypted server token may itself be used as the key for accessing the encrypted data, the unencrypted server token may be processed by a function (e.g., a hash function) to obtain the key or the unencrypted server token may be used with another piece of information (e.g., a device token) to obtain the key. The processing of the unencrypted server token may generate a key of a predetermined length for use with the encryption algorithm. The unencrypted server token may also be obtained from encrypted server token 267 stored in the client device 100A by using a password received from a user.

Figure 3:
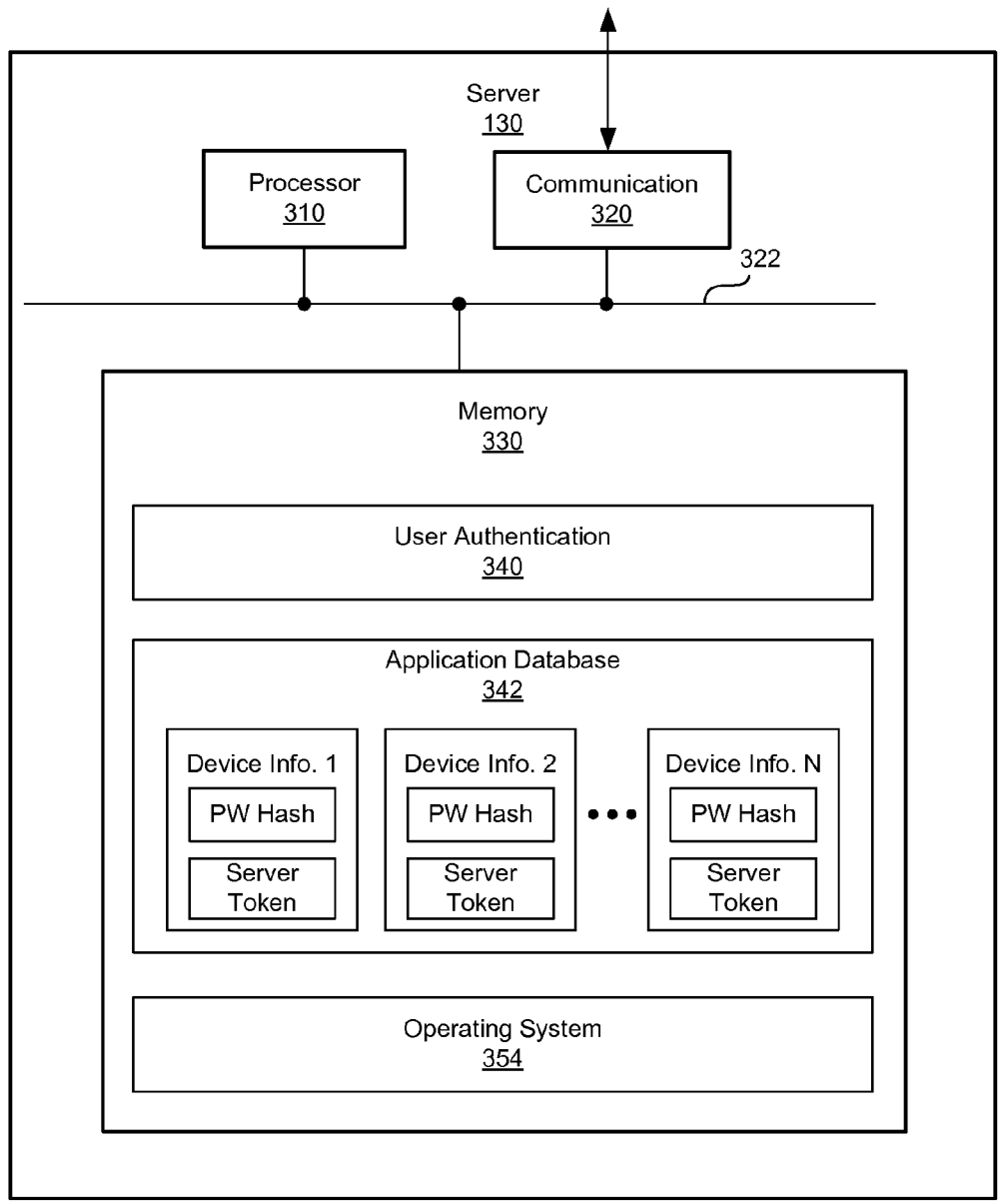
FIG. 3 is a block diagram illustrating a server according to one embodiment.

FIG. 3 is a block diagram illustrating the server 130 according to one embodiment. The server 130 may include, among other modules, a processor 310, a memory 330, and a communication module 320. Not all components of the server 130 are shown in FIG. 3 and certain components not necessary for illustration of the present invention (for example, input modules) are omitted herein. Each component of the server 130 may be communicatively coupled through a bus 322. Each component of the server 130, whether alone or in combination with other components, can be implemented for example, in software, hardware, firmware or any other combination thereof.

The processor 310 is a conventional processor or controller such as Intel® Pentium® processor, and ARM processor. The processor 310 reads and executes instructions and/or data stored in the memory 330. The instructions and/or data executed on the processor 310 include codes for performing any techniques described herein. In one embodiment, the memory 330 is a dynamic random access memory (DRAM) device, a static random access memory (SRAM) device, or some other conventional memory device. The communication module 320 performs operations to establish connections and communicate with the client devices 100.

The memory 330 is a non-transitory computer-readable storage medium that stores, among other data, a user authentication module 340, application database 342 and an operating system 354. The application database 342 stores data entries for different client devices illustrated in FIG. 3 as device information 1 through device information N. Each entry of device information stores a password hash and a server token for a user of a corresponding client device. Although not illustrated in FIG. 3, each entry of device information may store further information dedicated to each user such as user account information and user data (which may be a copy of the encrypted data 268). The operating system 354 manages the software and hardware resources of the server 130 and supports various functions performed by the application database 342.

The user authentication module 340 authenticates the user by comparing the stored password hash with a subsequently received hash value of a user input. In addition, the user authentication module 340 may implement additional security measures such as disabling sending of a server token to the client device responsive to receiving a disable request from the user. Alternatively or in addition, the user authentication module 340 may use geographic locations of the client devices 100, frequency and interval of client's requests (indicative of machine generated attacks) or other statistical information to prevent sending of the server token when the activities at the client devices 100 are suspicious.

Figure 4:
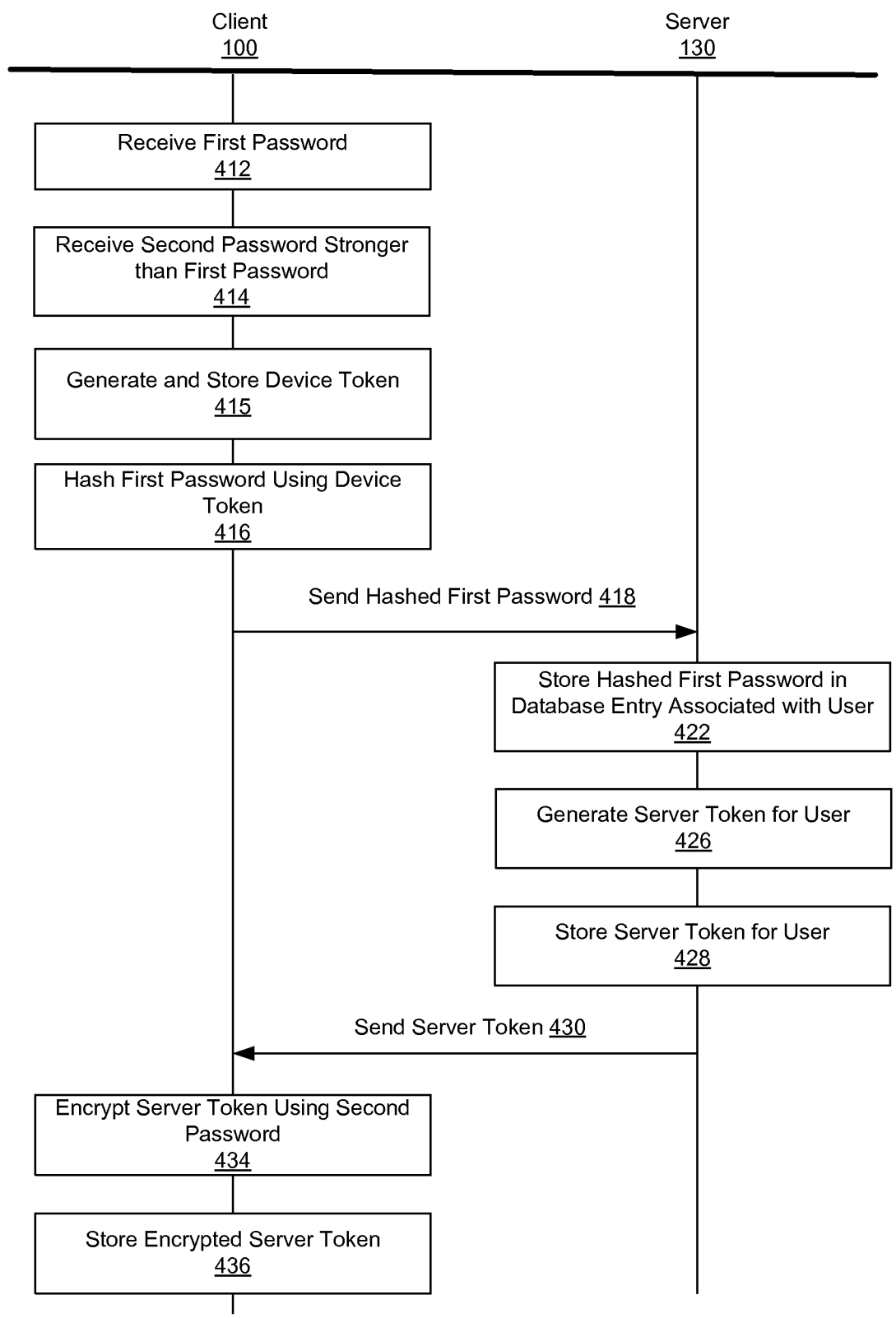
FIG. 4 is an interaction diagram illustrating a process of setting up of an enhanced authentication scheme, according to one embodiment.

FIG. 4 is an interaction diagram illustrating a process of setting up of an enhanced authentication scheme, according to one embodiment. First, the client device 100 receives 412 a first password. The client device 100 also receives 414 a second password. The second password is stronger than the first password against attack by a third party, for example, by including a longer string of characters and/or enabling more diverse choices of characters in the password. For example, the first password may be four characters long whereas the second password may be eight characters long. Further, each character of the first password may be a number from 0 through 9 whereas each character of the second password may be an alphanumeric including both numbers and alphabet characters. It is to be noted that the first password is easier to use and faster to enter on the client device 100 compared to the second password.

The client device 100 also generates and stores 415 a device token that can be used in conjunction with the server token to generate a key for accessing a secure application or encrypt or decrypt data.

The first password is then hashed 416 by the server interface 270 using the device token. The hashed first password is then sent 418 to the server 130. The server 130 stores 422 the hashed first password in the database entry of the application database 342 associated with the user. The hashed first password may later be used to authenticate the user based on a user input provided by the user, as described below in detail with reference to FIG. 5.

The server 130 generates 426 a server token for the user. The generated server token is stored 428 in the database entry of the application database 342 associated with the client device of the user. The generated server token is also sent 430 to the client device 100.

The client device 100 receives the server token and encrypts 434 the server token using the second password. The server token may be encrypted further using the device token. The encrypted server token is then stored 436 in the client device 100. The encrypted server token is later used for accessing the application or encrypted data 268 when connectivity to the server 130 is unavailable, as described below in detail with reference to FIG. 6.

The process described above with reference to FIG. 4 is merely illustrative. Various modifications may be made to the steps illustrated in FIG. 4. For example, the use of device token may be obviated, and the first password can be hashed

416 without using any device token. Further, the sequence of the steps may be altered. For example, the step of generating the device token may precede the steps of receiving the first and second passwords.

Figure 5:
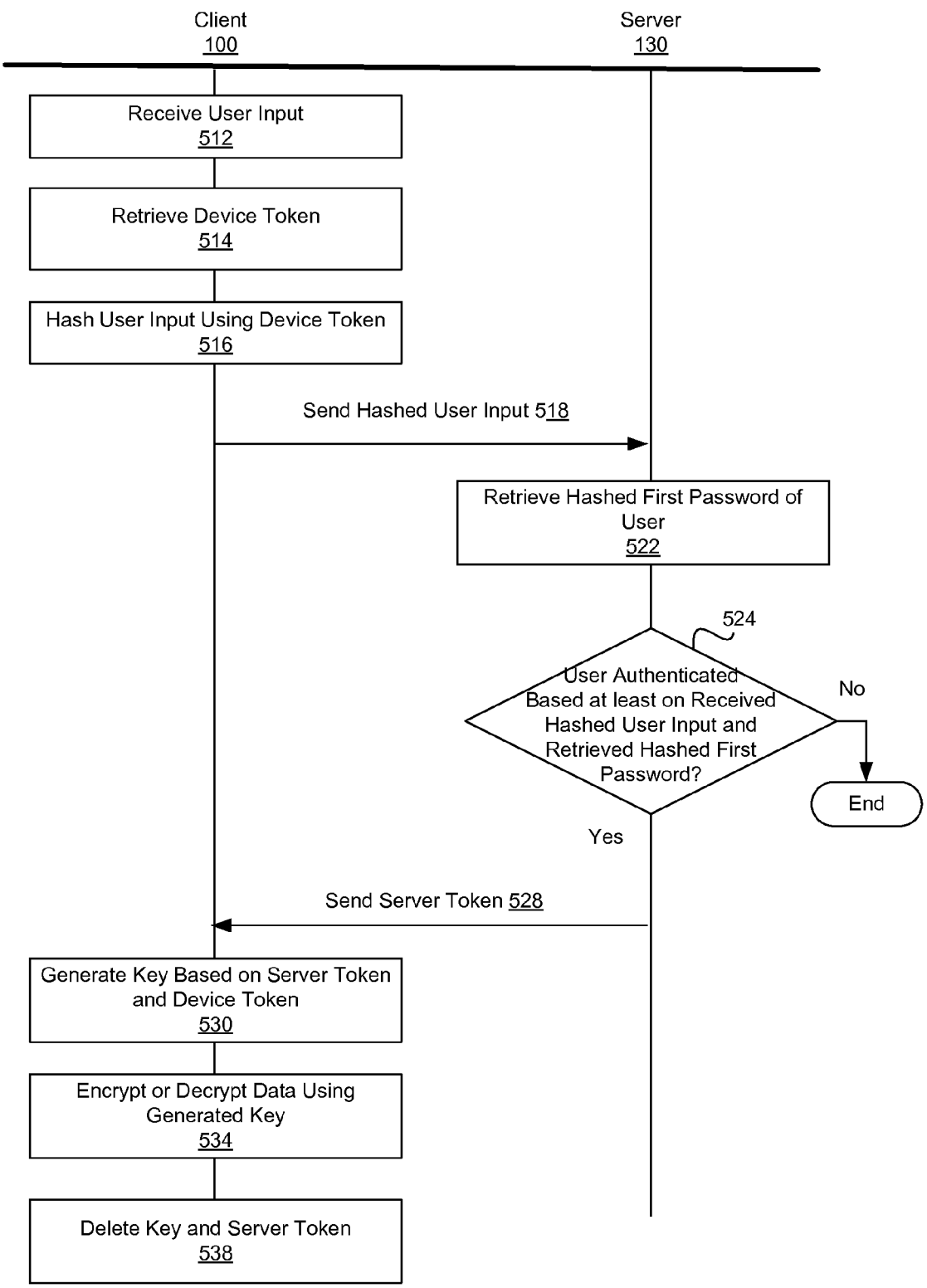
FIG. 5 is an interaction diagram illustrating a process of authenticating a user when communication between a client device and the server is available, according to one embodiment.

FIG. 5 is an interaction diagram illustrating a process of authenticating a user when communication between the client device 100 and the server 130 is available, according to one embodiment. First, a user input that the user believes to be the first password provided to the client device 100 and received 512 at the client device 100. The client 100 also retrieves 514 the device token. The received user input is hashed 516 using the device token and then sent 518 to the server 130.

The server 130 retrieves 522 the hashed first password of the user stored in the application database 342. It is then determined 524 whether the user is authenticated 524 based at least on the hashed user input and the retrieved hashed first password. If the hashed user input matches the hashed first password, then the user may be authenticated. In addition, the server 130 may employ additional factors to authenticate the user such as detecting the locations of the client device 100, analyzing patterns of usage or using other statistical information to detect factors that raise suspicion on the authenticity of the user. By employing such additional authentication schemes, the server 130 can reduce the chance of unauthorized access to the application or encrypted data by unauthorized persons despite using a simple first password. If the user of the client device 100 is not authenticated, the process terminates without sending the server token to the client device 100.

If the user is authenticated, the server 130 sends 528 the unencrypted server token to the client device 100 over the network 110. After the client device 100 receives the unencrypted server token, the client device 100 generates 530 a key using the combination of the server token and the device token. The client device 100 may then encrypt or decrypt 534 the data using the generated key.

After the access to the secure application or encrypted data is terminated, the key and the server token are deleted 538 from the client device 100 to prevent unauthorized access using the stored server token.

The process of FIG. 5 is merely illustrative. In other embodiments, the server token itself may be used as the key for encrypting or decrypting data or the server token may be processed by a function (e.g., a hash function) to obtain the key. In such embodiments, the step of generating key 530 may be omitted. Moreover, in some embodiments, device tokens are not used. In such embodiments, the user input is hashed 516 without using a device token.

Figure 6:
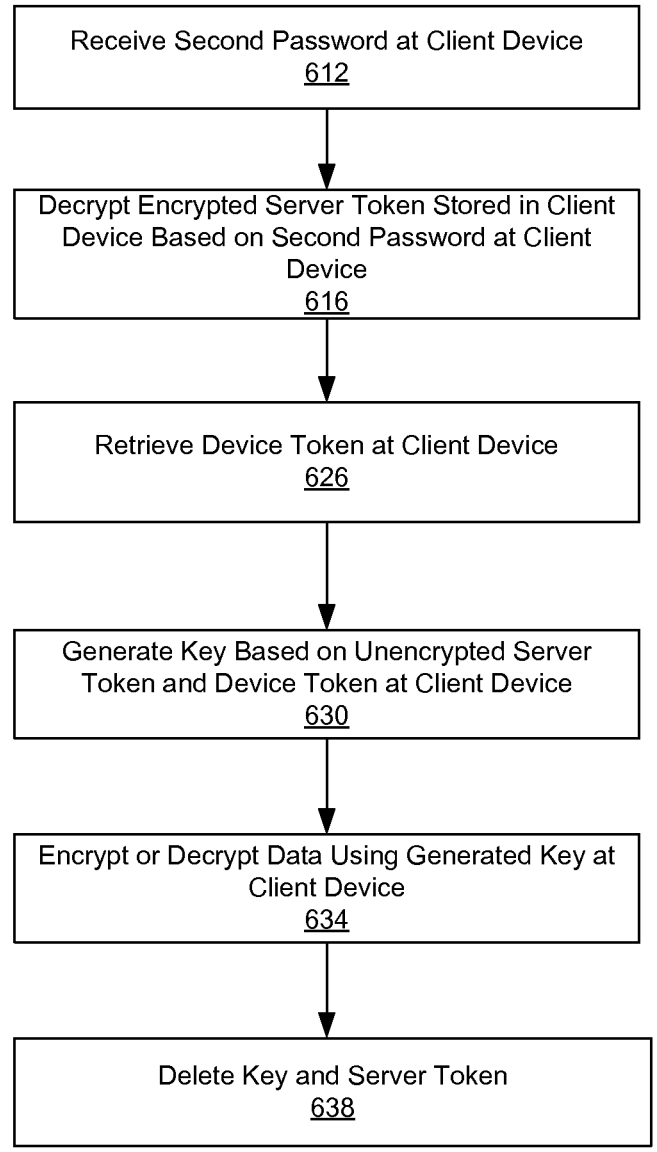
FIG. 6 is a flow chart illustrating a process of authenticating a user when communication between the client device and the server is unavailable, according to one embodiment.

FIG. 6 is a flow chart illustrating a process of authenticating a user when communication between the client device 100 and the server 130 is unavailable, according to one embodiment. When the client device 100 cannot receive the unencrypted server token from the server 130 via the network 110 at the time that the user is attempting to access the application or encrypted data, the encrypted server token stored in the client device 100 is used to gain access to the secured application or the encrypted data 268 in the client device 100. To decrypt the encrypted server token, the client device 100 receives 612 a user input that the user believes to be the second password.

Using the second password, the encrypted server token stored in the client device 100 is decrypted 616. A device token stored in the client device 100 is retrieved 626. The key for accessing the secured application and/or encrypted data 268 is generated 630 at the client device 100 using the combination of the server token and the device token. The key is then used to encrypt or decrypt 634 data at the client device 100.

After the access to the secure application or encrypted data is terminated, the key and the server token are deleted 638 from the client device 100 to prevent access to the secure application or encrypted data by an unauthorized person using the server token and the key.

The second password for decrypting the server token is stronger against cracking than the first password due to, for example, the longer length or more diverse set of characters that can be used in the password. However, due to the same reason, the second password may take more time and effort on the side of the user to input at the client device 100. Hence, the use of the second password may be limited to instances when the client device 100 cannot communicate with the server 130. In this way, the user can conveniently use a shorter and less complicated first password to access the secured application or the encrypted data 268 most of the time when the client device 100 can communicate with the server 130 while being allowed to access the secured application or the encrypted data 268 using a longer and more complicated second password when the client device 100 cannot communicate with the server 130.

The method as illustrated in FIG. 6 is merely illustrative and various modifications may be made to the steps and sequences of the steps in FIG. 6. In other embodiments, the unencrypted server token may be used as the key for encrypting or decrypting the data. In such embodiments, the step 626 of retrieving the device token and the step 630 of generating the key may be omitted. Alternatively, the unencrypted server token may be processed by a function (e.g., a hash function) to obtain the key. In such embodiments, the step 626 of retrieving the device token may be omitted.

Figure 7A:
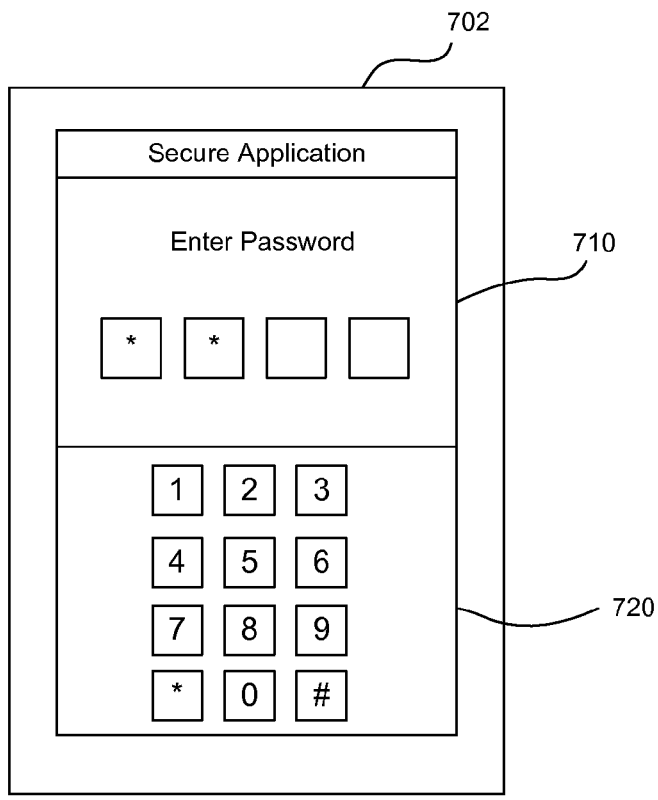
FIG. 7A is a graphical user interface diagram for receiving a user password when communication between a client device and the server is available, according to one embodiment.

FIG. 7A is a graphical user interface diagram for receiving the first password when communication between the client device 100 and the server 130 is available, according to one embodiment. The graphical user interface includes a first area 710 and a second area 720. The first area 710 displays characters of the first password as the characters are being entered by the user. The length of the first password is four characters in this example. The second area 720 displays numbers and characters that may be pressed to enter the first password.

Figure 7B:
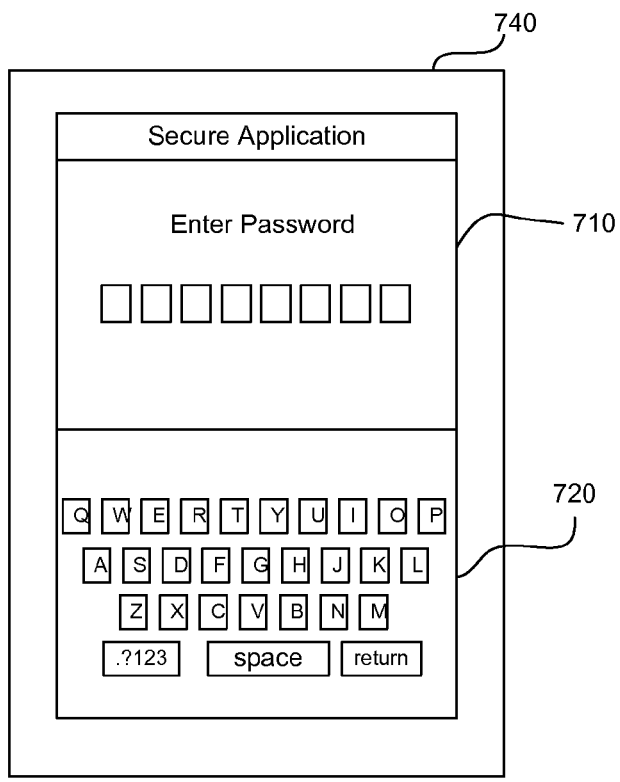
FIG. 7B is a graphical user interface diagram for receiving a user password when communication between a client device and the server is unavailable, according to one embodiment.

FIG. 7B is a graphical user interface diagram for receiving the second password when communication between a client device and the server is unavailable, according to one embodiment. The graphical user interface includes a first area 710 and a second area 720. The first area 710 displays characters of the second password as the characters are being entered. The length of the second character is eight characters in this example. The second area 720 displays numbers and characters that may be pressed to enter the second password.

In one embodiment, the length of the second password may be variable. That is, instead of using a fixed length of characters (e.g., eight characters), the user can choose the length of the second password.

The user interface diagrams of FIGS. 7A and 7B are merely illustrative. Various other types of arrangements to receive and display passwords may be used. Further, the number of characters in the first and second passwords may be not be limited to four and eight, respectively.

Upon reading this disclosure, those of ordinary skill in the art will appreciate still additional alternative structural and functional designs for authenticating access to secured applications and encrypted data on a client device. Thus, while particular embodiments and applications of the present invention have been illustrated and described, it is to be understood that these embodiments are subject to various modifications, changes and variations which will be apparent to those skilled in the art may be made in the arrangement, operation and details of the method and apparatus disclosed herein without departing from the spirit and scope of the disclosure.

What is claimed is:

1. A method of authenticating a user on a first computing device, comprising:
   receiving a user input at a first time from a user of the first computing device for authenticating the user;
   generating first information derived from the user input at the first computing device;
   sending the first information to a second computing device for comparison with second information stored in the second computing device, the second information derived from a first password provided by the user at a second time preceding the first time;
   receiving an unencrypted server token from the second computing device responsive to the second computing device authenticating the user based at least on matching of the first information and the second information;
   using the unencrypted server token to access an application or encrypted data in the first computing device;
   receiving a second password at a third time from the user of the first computing device for authentication of the user, the communication between the first and the second computing devices unavailable at the third time and
   decrypting an encrypted server token stored in the first computing device using the second password to obtain the unencrypted server token.

2. The method of claim 1, wherein the second computing device authenticates the user based further on at least one of a geographical location of the first computing device, frequency or interval of requests from the first computing device, and statistical information associated with usage of the first computer device.

3. The method of claim 1, wherein using the unencrypted server token comprises (i) using the unencrypted server token as a key or (ii) generating the key by processing the unencrypted server token for accessing the application or the encrypted data.

4. The method of claim 1, wherein using the unencrypted server token comprises generating a key for accessing the application or the encrypted data based on the unencrypted server token and a device token of the first computing device.

5. The method of claim 1 wherein the second password is stronger than the first password.

6. The method of claim 1, wherein the second password is longer than the first password.

7. The method of claim 1, wherein the first information is obtained by processing the first user input by a hash function, and the second information is obtained by processing the first password by the hash function.

8. The method of claim 1, further comprising deleting the unencrypted server token and data derived from the unencrypted server token from the first computing device responsive to terminating access to the application or the encrypted data.

9. A first computing device, comprising:
   a processor;
   an input module configure to receive a user input at a first time from a user of the first computing device for authentication of the user; and
   an application configured to:
      generate first information derived from the user input,
      send the first information to a second computing device for comparison with second information stored in the second computing device, the second information derived from a first password provided by the user at a second time preceding the first time,
      receive an unencrypted server token from the second computing device responsive to the second computing device authenticating the user based at least on matching of the first information and the second information;
      use the unencrypted server token to access an application or encrypted data in the first computing device;
      receive a second password at a third time from the user of the first computing device for authentication of the user, the communication between the first and the second computing devices unavailable at the third time; and
      decrypt an encrypted server token stored in the first computing device using the second password to obtain the unencrypted server token.

10. The first computing device of claim 9, wherein the second computing device is configured to authenticate the user based further on at least one of a geographical location of the first computing device, frequency or interval of requests from the first computing device and statistical information associated with usage of the first computer device.

11. The first computing device of claim 9, wherein the application is configured to (i) use the unencrypted server token as a key or (ii) generate the key by processing the unencrypted server token for accessing the application or the encrypted data.

12. The first computing device of claim 9, wherein the application is configured to generate a key for accessing the application or the encrypted data based on the unencrypted server token and a device token of the first computing device.

13. The first computing device of claim 9, wherein the second password is stronger than the first password.

14. The first computing device of claim 9, wherein the second password is longer than the first password.

15. The first computing device of claim 9, wherein the first information is obtained by processing the first user input by a hash function, and the second information is obtained by processing the first password by the hash function.

16. The first computing device of claim 9, wherein the application is further configured to delete the unencrypted server token and data derived from the unencrypted server token from the first computing device responsive to terminating access to the application or the encrypted data.

17. A non-transitory computer-readable storage medium storing instructions thereon, the instructions when executed by a processor cause the processor to:
   receive a user input at a first time from a user of the first computing device for authentication of the user;
   generate first information derived from the user input at the first computing device;
   send the first information to a second computing device for comparison with second information stored in the second computing device, the second information derived from a first password provided by the user at a second time preceding the first time;
   receive an unencrypted server token from the second computing device responsive to the second computing device authenticating the user based at least on matching of the first information and the second information;
   use the unencrypted server token to access an application or encrypted data in the first computing device;
   receive a second password at a third time from the user of the first computing device for authentication of the user, the communication between the first and the second computing devices unavailable at the third time; and
decrypt an encrypted server token stored in the first computing device using the second password to obtain the unencrypted server token.

* * * * *